United States Patent [19]

Hamalainen et al.

[11] Patent Number: 5,802,465
[45] Date of Patent: Sep. 1, 1998

[54] DATA TRANSMISSION IN A RADIO TELEPHONE NETWORK

[75] Inventors: Jari Hamalainen, Tampere; Timo Jokiaho, Vantaa, both of Finland

[73] Assignee: Nokia Mobile Phones Ltd., United Kingdom

[21] Appl. No.: 724,375

[22] Filed: Oct. 1, 1996

Related U.S. Application Data

[63] Continuation of Ser. No. 301,340, Sep. 6, 1994, abandoned.

[30] Foreign Application Priority Data

Sep. 6, 1993 [FI] Finland .................. 933894

[51] Int. Cl.$^6$ ........................ H04Q 7/20
[52] U.S. Cl. ............... 455/403; 455/452; 455/560
[58] Field of Search .................. 455/403, 422, 455/450, 452, 455, 509, 516, 550, 560, 435; 370/389, 338

[56] References Cited

U.S. PATENT DOCUMENTS

| | | | |
|---|---|---|---|
| 4,763,319 | 8/1988 | Rozenblit | 370/84 |
| 4,837,800 | 6/1989 | Freeburg et al. | 379/59 |
| 4,887,265 | 12/1989 | Felix | 370/94.1 |
| 4,972,506 | 11/1990 | Uddenfeldt | 455/33 |
| 5,008,883 | 4/1991 | Eizenhofer et al. | 370/95.1 |
| 5,081,704 | 1/1992 | Umeda et al. | 455/33 |
| 5,103,445 | 4/1992 | Ostlund | 370/79 |
| 5,109,527 | 4/1992 | Akerberg | 455/33.2 |
| 5,142,533 | 8/1992 | Crisler et al. | 370/95.1 |
| 5,159,702 | 10/1992 | Aratake | 455/33.1 |
| 5,166,929 | 11/1992 | Lo | 370/85.3 |

(List continued on next page.)

FOREIGN PATENT DOCUMENTS

| | | |
|---|---|---|
| 0048854 A1 | 4/1982 | European Pat. Off. . |
| 0048861 A1 | 4/1982 | European Pat. Off. . |
| 0 369 535 A3 | 5/1990 | European Pat. Off. ......... H04Q 7/04 |
| 0 399 611 A3 | 11/1990 | European Pat. Off. ......... H04Q 7/04 |
| 0399612A2 | 11/1990 | European Pat. Off. . |
| 0587980 A2 | 3/1994 | European Pat. Off. . |
| 2 270 815 | 3/1994 | United Kingdom . |
| WO 94/10767 | 5/1994 | WIPO . |

OTHER PUBLICATIONS

IEEE Transactions On Vehicular Technology, "Voice and Data Integration in the Air–Interface of a Microcellular Mobile Communication System", vol. 42, No. 1, Feb. 93.
DeVile, J.M., "A Reservation Based Multiple Access Scheme For A Future Universal Mobile Telecommunications System", Seventh IEE European Conf. On Mobile And Personal Communications, 15 Dec. 1993, pp. 210–215.

(List continued on next page.)

*Primary Examiner*—Dwayne D. Bost
*Assistant Examiner*—William G. Trost
*Attorney, Agent, or Firm*—Perman & Green, LLP

[57] ABSTRACT

For bidirectional transmission of packet data, a packet data service unit (Agent) is disposed in a digital cellular system connected to be in association with a Mobile Switching Center, and connecting the cellular network to the date network. As a mobile station is connected to the packet data service unit, signalling related to connection formation characteristics of the network is first accomplished. As a result thereof, the mobile station and the data service unit are provided with a number of stored parameters relating to each other. This situation creates or is called a virtual channel. When a mobile station wants to transmit or receive data packets between the mobile station and the data service unit a packet data transfer channel is established making use of the parameters of the virtual channel and thereby using substantially less signalling than the channel establishment signalling characteristic of the network, one part thereof being a radio channel and the other part a time slot in a digital trunk line. On termination of data packet transfer, at least said radio channel is disassembled but the virtual channel is maintained until the disconnection of the mobile station from the data service.

32 Claims, 7 Drawing Sheets

U.S. PATENT DOCUMENTS

| | | | |
|---|---|---|---|
| 5,199,031 | 3/1993 | Dahlin | 370/110.1 |
| 5,239,678 | 8/1993 | Grube et al. | 455/54.1 X |
| 5,276,680 | 1/1994 | Messenger | 379/63 X |
| 5,359,603 | 10/1994 | McTiffin | 370/94.1 |
| 5,404,355 | 4/1995 | Raith | 370/95.1 |
| 5,404,392 | 4/1995 | Miller et al. | 379/59 X |
| 5,420,864 | 5/1995 | Dahlin et al. | 370/95.3 |
| 5,430,724 | 7/1995 | Fall et al. | 370/95.3 X |
| 5,434,847 | 7/1995 | Kou | 370/17 |
| 5,487,065 | 1/1996 | Acampora et al. | 379/63 X |

OTHER PUBLICATIONS

Ziegeler, R. et al., "An Experimental Implementation of the PRMA Protocol for Wireless Communication", IEEE, 1993, pp. 909–912.

Mouly, et al., The GSM System for Mobile Communications, 1992, France, pp. 215–216, 231–241, 346–349.

Hodges, M.R.L., The GSM radio interface, British Telecom Technology Journal vol. 8 No. 1, Jan. 1990, pp. 31–43.

"European digital cellular telecommunications system (Phase 2); Mobile radio interface layer 3 specification(GSM) 04.08)", ESTI, May 1995, pp. 37–40, 183–186.

"European digital cellular telecommunications system (Phase 2); Physical layer on the radio path General description (GSM 05.01)" ETSI, May 1995, pp. 1–19.

"European digital cellular telecommunications system (Phase 2); Channel coding (GSM 05.03)", ESTI, Aug. 1995, pp. 1–5 and Mar. 1995, pp. 1–31.

Electronics and Communication Journal, vol. 5, No. 3, 1 Jun. 1993, pp. 180–186, Dunlop, J., "A Reservation Based Access Mechanism For 3rd Generation Cellular Systems".

IEEE Transactions On Vehicular Technology, vol. 39, No. 4, 1 Nov. 1990, pp. 340–351, Mitrou et al. "A Reservation Multiple Access Protocol For Microcellular Mobile–Communicatin Systems".

Finnish Office Action dated 2 Aug. 1994 on Finnish priority application No. 933894 and English translation thereof.

S. Chakraborty, Data interworking with GSM, Proceedings of 5th Nordic Seminar on Digital Mobile Radio Communications, pp. 389–395, DMR V, Helsinki '92.

R. Tafazolli, B. G. Evans, Interworking and integration of the Inmarsat Standard–M with the Pan–European GSM system, Proceedings of 3rd.

International Mobile Satellite Conference, Jet Propulsion Lab, CA, 1993.

E. J. Younger, K. H. Bennet, R. Hartley–Davies, A Model for a broadband cellular wireless network for digital communications, Compter Networks and ISDN Systems, vol. 26, No. 4, Netherlands, 1993.

Data Networks, D. Bertsekas, R. Gallager, Prentice–Hall Inc., 1987 New Jersey, Chapters 2.7 and 2.8.3, pp. 91, 92, 99, 100, 101.

DATA TRANSMISSION IN A RADIO TELEPHONE NETWORK

This is a continuation of application Ser. No. 08/301,340 filed on Sep. 6, 1994, now abandoned.

FIELD OF INVENTION

The present invention relates to the transmission of data in a radio telephone network.

BACKGROUND OF THE INVENTION

An example of a radio telephone network, in this case a conventional digital cellular network, is shown in FIG. 1A. The network comprises Base Station Controllers (BSC), each of which control a number of Base Transceiver Stations (BTS). The BTS and mobile stations (MS) are connected via a radio communications channel. A Base Station Controller and the base stations with which it is connected form a Base Station Subsystem. The BSCs are connected to Mobile Switching Centres (MSC) via digital trunk lines which control the Base Station Subsystems. The MSCs route communication traffic to a general Public Service Telephone Network (PSTN) or private networks such as a Local Area Network (LAN). A Base Station Controller may also be physically located with the Mobile Switching Center. The service range of a base station forms a cell and a mobile station within the service range is typically served by that base station. The mobile station is able to move from one cell to another and roam from under the control of one Base Station Controller to be under the control of another Controller without losing a connection to the radio telephone network.

In known cellular networks data information can be transmitted between the home network of a mobile station and a terminal or destination network. The terminal network can include a home network, another network of the same system, a fixed telephone network, or a data network. The network services typically include synchronous and asynchronous circuit-switched data transfer from the cellular network to the external telephone network PSTN, to a circuit-switched date network or an ISDN network. Suggestions have also been made on implementing asynchronous packet switching to an external packet switched data network.

As shown in FIG. 1A, data transmitted by a mobile station enters a data Inter Working Functions unit, IWF, associated with the Mobile Switching Centre, from there via a modem to the Centre wherefrom it is further transmitted, e.g., via the PSTN, to a target means or target data network, such as a private LAN network. The transition network is thus the general telephone network.

A typical method of data transmission between networks and also within a network is circuit switching, in which a transfer channel is established for the transfer of data. Establishing a channel is a time-consuming operation and requires a lot of signalling, such as sending a control channel request and assignment of a channel, authentication checks, installation of an encrypting mode and others, before the channel is set up for transferring data information. Circuit switching, when applied for data transfer, is uneconomical since the transfer needs a wide frequency band. Also a user is charged irrespective of whether data is transmitted or not. This is because in a circuit-switched network the channel has to be maintained until all data information has been transmitted, which regarding the capacity is uneconomical. Since charging of the user is usually based on the length of the reserved connection time in the circuit-switched network, the user is obliged to pay for "nil" because the time used for the actual data transfer is a minor part of the total connection time. Typically, cellular networks have primarily been optimized for speech transfer, and for that purpose, circuit-switched data transfer is appropriate.

In a digital cellular network, such as in the European GSM network and in the American network of the EIA/TIA (Electronic Industries Association/Telecommunication Industry Association) standards, suggestions have been made on data communication as packets, as so-called packet data e.g., in the patent U.S. Pat. No. 4,887,265. This patent discloses a system in which several mobile stations send packet data to one base station using the same channel. When the Base Station Controller receives an assignment request for a data channel from the mobile station, it transmits a channel assignment to the mobile station, whereby the mobile station moves on that data channel. The same channel is also available for use for all other mobile stations within the range of said cell. A request, a channel assignment and transfer on a channel require a considerable amount of signalling. Handover of a data connection from one base station to another is also possible in this system. In the system disclosed by the patent, a permanent channel is provided for packet transfer, being constantly available, irrespective of a momentary need.

SUMMARY OF THE INVENTION

According to a first aspect of the invention there is provided a radio telephone system comprising:
 a mobile station; and
 a fixed station, wherein a parameter of the mobile station for setting up a data communication channel is capable of being stored by the fixed station and a parameter of the fixed station for setting up a data communication channel is capable of being stored by the mobile station, for forming a virtual data communication channel between the mobile station and the fixed station, thereby expediting establishment of a real data communication channel.

According to a second aspect of the invention there is provided a method of transmitting data in a radio telephone network comprising:
 storing a parameter of a mobile station for setting up a date communication channel at a fixed station; and
 storing a parameter of the fixed station for setting up a data communication channel at the mobile station, for forming a virtual data communication channel between the mobile station and the fixed station, thereby expediting establishment of a real data communication channel.

According to a third aspect of the invention there is provided a radio telephone adapted to store a parameter for setting up a communication channel of a fixed station for forming a virtual data communication channel with the fixed station thereby expediting establishment of a real data communication channel.

These aspects of the invention provide the advantage that a real data communication channel can be established quickly and when a mobile station desires to transmit data. In between the transmission of data the real data communication channel can be switched to a virtual data communication channel ready for quick reestablishment. Thus, a communication channel does not have to be continually open, even during no actual transmission of data. Thus, the costs of transmitting data are reduced.

Alternatively, the virtual data communication channel can be formed if a mobile station having data transmission capability registers with the fixed station, or if a mobile station registered with the fixed station requests a data communication channel. An advantage of forming a virtual data communication channel only when a mobile station requests a data communication channel is that unnecessary signalling is avoided.

Optionally, the data communication channel can be a channel usually reserved for speech transmissions, or signalling or control transmissions. A particular advantage of using signalling or control channels is that the transmission of data does not reduce the number of speech channels available to the users of the system.

Advantageously, the data communication channel is adapted for transmitting packet data, which is a transmission form particularly suitable for use with a data communication channel which can quickly be opened or closed.

Another advantage is that data packets can be created at the mobile stations and transferred directly to a data network without the need for transition networks, such as Packet Assembler/Disassemblers (PADs) or using the PSTN. Additionally, the mobile station itself can receive packet data, i.e. the system is bidirectional.

An appropriate existing cellular system currently in use is, for instance, the European GSM system.

Embodiments of the invention will now be described by way of example only and with reference to the drawings, in which:

DETAILED DESCRIPTION OF EMBODIMENTS OF THE INVENTION

Figure 1A:
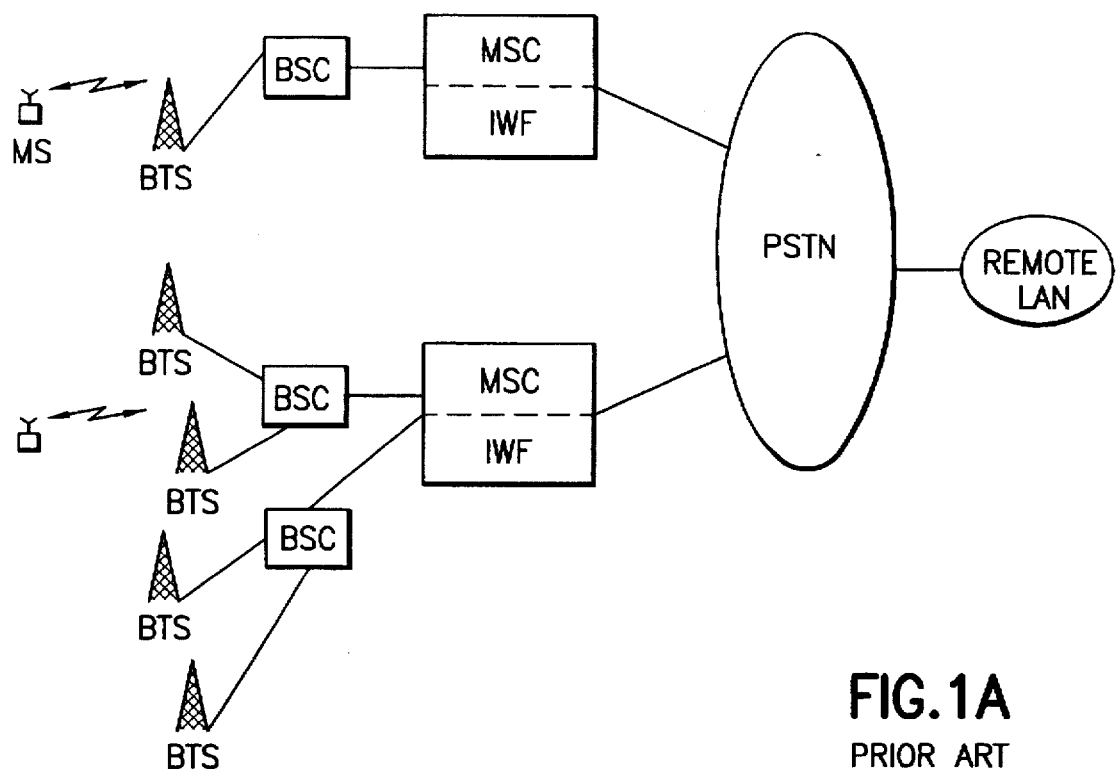
FIG. 1A presents a cellular network in accordance with the prior art.

In a particular example of a cellular network, the physical channel of a mobile station and a base station, that is, a radio frequency channel, consists of consecutive frames which in turn consist of time slots, in one of which the transmission is performed, the reception in another, in another listening to paging calls, etc. The respective time slots constitute a logical channel, of which a great number may be available.

In digital cellular networks, a mobile station can send and receive data on a traffic channel particularly intended for speech and data transfer. Both of them cannot be transmitted simultaneously but the user or the network makes a selection which thereof is to be transferred. Data as well as speech are sent as bursts on a radio channel. This means that in a transmission time slot a brief data burst is transmitted in the middle of the time slot so that a considerable part of the total time used for transmission means the time between the bursts when no information is transferred.

A particular type of data service known as packet data service has been defined in the GSM network. In this service, the number selected by a data transmitting mobile station informs the network that a circuit-switched connection has to be created to a packet assembling or disassembling unit performing the connection with a data network, such as X.25, which can be a Packet Assembler/Disassembler (PAD) or a Packet Handler (PH). The Packet Assembler/Disassembler can be placed in association with or also behind the ISDN network. The mobile station sends data as continuous data flow, not as packets, to PAD or PH, which forms the data packets and transmits them onwards via the data network to the target. If PH is a so-called Basic Packet Handler, the data connection is always located via a given point PH, even in any network. The Basic Data Handler also supports the mobile terminated direction in data transmission. On the other hand, the mobile terminated direction is not supported by the so-called dedicated Packet Handler, nor PAD. The traffic between the mobile station and the packaging means imitates synchronous or asynchronous data transfer, wherebelow a radio traffic protocol RLP is located.

In the data packet service of the GSM network no packets are produced in the mobile stations, but in PAD. The traffic is unidirectional also in the sense that the connection is mobile station-originated, i.e., the station should send a request to the network for creation of a data connection. No packets can be sent to the mobile station unless the station itself has first requested the opening of a line. It is also to be noted that data is conducted via the telephone network, the pricing of the data transfer whereof being much higher than pricing of transfer within a data network.

The sending and reception function of data packets can be arranged to be positioned in all mobile stations or in some of them only. For the mobile stations without such function, a packet data transfer is to be completely opaque so that mobile stations of different types are enabled to function without any problems in the network simultaneously. Thus, the packet data feature is an additional service provided by the network, though requiring that the mobile station possesses a property to use such service. The implementation of the system must be such that it requires only a few changes in digital cellular systems in current use and, as an additional feature, it is well appropriate for use in current systems such as GSM, DCS 1800 operating in 1.8 GHz range or PCN.

In new networks a so-called Short Message Service is most often determined, wherewith a mobile station is enabled to transmit and receive temporally short messages. A transfer of a short message requires, however, standard connection formation routines, thus requiring part of the frequency band and limiting the amount of data to be transferred.

For transferring packet data no allocated radio channel and data route via the network are maintained continuously.

In accordance with the invention, a virtual channel is arranged for data packet transfer in the network between the mobile station and the Mobile Switching Center. When a phone provided with a packet data function enters the range of the Mobile Switching Center, assigned as a user of the packet data service, all necessary signalling is executed, whereafter the Center, or more specifically, the packet data service unit (Agent) in association therewith is provided with all the information it needs concerning the phone and establishing a true transfer channel. Such data, containing in fact information about the location of the phone, is called a virtual channel. The virtual channel is thus a virtual connection between the mobile station and the data service unit, enabling fast transition into data transfer mode, paying regard to the parameters stored in the memories of the mobile station and the data service unit. When packet data has to be transferred from the phone to the network, or vice versa, no complete signalling is needed between the phone and the Center, since that was carried out earlier; instead, a true transfer route can be set up extremely fast and with very low-level signalling between the mobile station and the packet data service unit (Agent), whereupon the packets are transferred. The transfer route, or at least the radio channel, is released as soon as there is no packet data to be transferred. Instead, the virtual channel is kept in constant preparedness as long as the mobile station is listed in the data service. In accordance with the present invention, a very rapid connection to the packet data transfer mode can be made, and the transfer route is kept reserved only when there is something to be transferred.

A means to control the transfer of packet data is arranged to be in conjunction with the Mobile Switching Center, and is known as a data service unit (Agent), which can be a computer or a process. It is a data service center provided with a number of connection services and which has access to other networks and the services thereof. The Agent has been placed logically in association with a Mobile Switching Center MSC, though the physical location can be inside the Center as part of the processes thereof or outside the Center in the form of one or more computers connected via a transmission link to the Center. The basis of the Agent is an Interface Unit IFU connecting the cellular network to another network, such as to TCP/IP or OSI networks (TCP= Transmission Control Protocol, IP=Internet Protocol, OSI= Open Systems Interconnection). Thus, a mobile station MS provided with a packet data function communicates by means of the data service unit (Agent) with the other networks, and the virtual channel is placed specifically between it and the data service unit (Agent). Therefore, each mobile station utilizing the packet data service under the control of the Mobile Switching Center is supervised by the data service unit (Agent) in association with the Mobile Switching Center.

The Agent performs at least some of the following functions: It registers all telephones provided with a packet data function under the control of the Mobile Switching Center, informs the phone of a message to arrive, removes the phone from the register after terminating of connection, transfers the messages of the phone to the rest of the network, transfers the messages from the rest of the network to the phone, buffers messages with a view to efficient transmission via the network, when necessary, performs encrypting/decrypting, when necessary, performs compression/decompression between the phone and the Agent, updates the data base thereof (location updating), receives messages addressed to the paging channel.

Normally, the virtual channel is initialized when the user starts using the packet data service, and the channel is terminated after the user leaves the service. During the time between the start and the termination, i.e., while being connected with the service, the mobile station is able to move and transfer from one cell to another. The handover function prerequires disassembling the virtual channel and assembling a new one. The handover is practically unobservable by the user.

When entering the cell area, a mobile station listens to the System Info channel, characteristic of all cellular networks and constant transmission from the base station, being therethrough informed if the packet data service is in use in the network or in the cell. A System Info message may include an identification referring e.g., to the packet data service. When a mobile station wants to be connected to a packet data service, it transmits via a base station to the network a request for setting up a virtual channel. The request commences in the network a standard control signalling sequence utilized thereby and characteristic of said network, in which the authentication of the requester is checked, encrypting is started and the requester is provided with an interim identification number. The Agent in association with the Mobile Switching Center controlling the packet service, is also informed, whereby it includes the supervision of the mobile phone under the control thereof. The Mobile Switching Center maintains an ongoing register on the location of the mobile station, whereby handover from one cell to another is possible and a fast preparedness to transfer to data transmission or reception exists because there is no need for the phone to request separately for a traffic channel.

Instead of a System Info message, it is also possible to operate so that the mobile station requests the network via a short message service whether the packet data function is engaged. The network responds by an equal message of the short message service. The short message services (SMS) are a service mostly included in the digital networks.

The control signalling associated with the management of the data connection between the data service unit (Agent) in association with the Mobile Station and the Mobile Switching Center MSC is executed along with the data messages in the signalling plane. The functions in the signalling plane are provided with functions for setting up, maintaining and terminating a connection between the cellular network and the other networks. It also includes functions for updating the register, authentication, and a function for providing an interim subscriber number TMSI.

A plurality of protocols are available for use in the transfer of data packets between the mobile station and the data service unit (Agent). The radio interface sets, however, certain limits, such as a requirement for minimizing the amount of data transmitted across the interface. The amount can be minimized by compressing the data section of the packets. The data are compressed prior to transmission, e.g., by means of V.42bis compression algorithm, and the receiver decompresses the data using the same algorithm. Also the bit amount in the header of the data packets may be reduced. Such functions are attended to by a Virtual Channel Protocol, which also attends to the control messages between the agent and the mobile station, as well as adapts the packets of the upper protocols into the Radio Link Protocol (RLP) frames. A paging message transmitted to all mobile stations (broadcast) of the cell or to certain mobile stations (multicast) is transmitted on the data section of the broadcast or the multicast protocols, respectively.

After the virtual channel has been assembled between the mobile station and the base station, the mobile station can neither start nor receive ordinary calls. Instead, the transmission and reception of short messages SMS is possible.

When wishing to transmit data packets, a mobile stations ends a request to the network for channel assignment. Since the majority of the signalling needed in establishing a channel has been already executed at the beginning of creating the virtual connection, the setting up of a data packet transfer channel extending from the mobile station to the Agent, required at this moment, is fast. This means a short time from the channel assignment request to transmission of packets.

The transmission may be accomplished according to a first or second embodiment of the invention. When a user of the mobile station switches off the packet data function on termination of data transmission or when the network terminates the connection, the data route is disassembled and the radio channel is released; optionally, the virtual channel may be maintained.

A packet data session refers to the time commencing when a user starts a packet data function (informs of his desire to be connected to the service), and ending when the user terminates the service. In the course of the session the user may transmit packets both to a terminal network and receive them from the source network. Roaming and handover are possible. In the course of a session one or several virtual channel connections are created, though only one at a time.

In accordance with a first embodiment, the radio channel for a data route is a standard traffic channel of a cellular system which is intended for transfer of speech and non-packet shape data via broadcasting between a mobile station and a base station. When wishing to transmit data from a mobile station (i.e., mobile originated), the station requests the network via a base station for a channel using the same signalling channel as normally used when the station sends a request to connect a call. The signalling channel is a random access channel which all mobile stations of the call use. The channel runs from the mobile station to the base station, that is, it is a so-called uplink direction channel. Due to the random access, collisions may occur when channel requests enter simultaneously. In such an event the request has to be repeated. The request message includes a special bit configuration, an identification block with which the station reports of a service it wants to have, such as speech, data, packet data; in the present case, the identification configuration indicates that the desired service is transmission of packet data.

After the network has processed the request and allocated the traffic channel, it transmits to the mobile station on the signalling channel a response containing information as to which traffic channel the station should move onto in order to transmit packet data. The channel on which the network responds to channel requests is a common Access Grant CHannel and is in a downlink direction. The mobile station tunes its transmitter onto the allocated traffic channel, and immediately starts transmitting packet data. The transmission lasts until all the data has been transmitted. The network may also start a particular counter or timer when the traffic channel has been allocated, whereby the transmission continues until the counter or timer expires. It is preferred to store the data to be transmitted in a buffer memory of the mobile station and to erase the memory by transmission.

When packet data is transferred according to the first embodiment via the network to a mobile station (mobile terminated transfer), the only difference from a transfer in the opposite direction is that the network informs the mobile station of a packet data transmission to come. For transmitting such information, a common paging channel is used. All mobile stations within the range of the cell continuously listen to this common downlink paging channel (speech pagings are transmitted on this channel). When the mobile station has received a message indicating that packet data is coming in, it acts in the same way as in the mobile-originated case: It transmits a traffic channel request to the base station, receives data on the channel, and moves immediately on to the traffic channel assigned thereto, thus being prepared to receive data packets. On termination of data flow, the network disassembles the traffic channel, so that it is released for use of other mobile stations present within the range of the cell. The data to be transmitted is preferably stored in a data buffer of the data service unit (Agent) and the buffer is erased all at once.

In accordance with the first embodiment, when transmitting packet data one traffic channel is reserved for such date which is normally used for transferring speech. On termination of transmission, the traffic channel is again free for use by any mobile station. The same mobile station may send another request for packet data transmission, whereby the sequence "channel request-transmission—channel release" can be repeated until the mobile station leaves the packet data service, and the virtual channel is disassembled.

In accordance with a second embodiment of the invention, a signalling channel or a control channel is used either exclusively or as an alternative to the use of the traffic channel for the transmission of packet data.

In accordance with the second embodiment, when a mobile station wishes to transmit data packets, i.e., mobile originated transfer, it sends a channel request page to a base station using the same random access channel upon which ordinary channel requests are transmitted. Said channel is in an uplink direction. All mobile stations of the cell employ the same channel for speech channel requests. The Mobile Switching Center decides, after receiving the request, which channel the mobile station should move to for data transmission. The channel can be either a standard traffic channel or a control channel. The control channel can be the same random access channel on which the channel requests are transferred from the mobile stations to the base station. The network establishes a traffic channel provided it has been selected to be the transfer channel. The base station transfers information to the mobile station on whether it is expected to use the standard traffic channel or the control channel for data transmission. Such information is transmitted on the Common Control CHannel, on the Access Grant CHannel, upon which channel the channel assignment is sent to the mobile stations. The mobile station moves to the traffic or control channel thus assigned, starting immediately to transmit packet data. In the course of the transmission, the channel may be handed over from the traffic channel to the control channel, and vice versa, even several times. On termination of transmission, the channel is disassembled and it is released for other uses. The transfer ends after a given time elapses or when a "packets over" message is received from the station.

If the network is required to transfer packet data to a mobile station, i.e., mobile terminated transfer, it informs the station via the standard common paging channel of a data packet transmission on the way. The paging includes a particular identification part (bit configuration) indicating that a packet data transfer is in question. In such paging the identification of a second mobile station has been replaced by the user's data section, including a packet coming in to the user from outside. If a packet from outside cannot be accommodated in one data section of the paging message, it is divided into several paging messages, all of which the mobile station receives, gathering one packet therefrom. When the mobile station has received the packet, it acts thereafter in the same way as when desiring to transmit data packets: it transmits a channel request to the base station, receives a channel assignment, moves on the assigned channel, the traffic channel or the control channel, and acknowledges the packet it has received.

The data route connection between the base station and the Agent connected with the Mobile Switching Center can be implemented in a number of ways. One possibility is to reserve a direct connection and to maintain the connection reserved continuously for packet data traffic. This means an ongoing existence of the connection so that no extra delays are formed. The connection can be a PCM time slot or several PCM time slots in the digital trunk line between the Base Station System (BSS) and the Mobile Station Center (MSC). When a mobile station provided with a packet data reception and transmission property enters the range of the cell in association with the base station, e.g., a BTS in FIG. 1A, the network immediately establishes a direct connection between the base station and the Mobile Switching Center provided for transmission of packet data. The connection can be one or several time slots in the PCM trunk line commonly used by all mobile stations provided with the packet data function. The entry of the mobile station into the cell is known because it has been transferred either as a result of a handover function, or, if entry from outside into the reception area is in question, or the phone is switched on, the phone is registered in the network.

In an embodiment such as the one described above the PCM channel within the network is constantly maintained but the radio route channel is reserved only when needed.

The use of the PCM time slots may also be optimized in that a direct connection is maintained only if the Base Station System (BSS) includes existing virtual connections, that is, at least one cell under the control of the Base Station Controller includes a mobile station connected to the packet data service, being in readiness to receive and transmit packet data. The direct connection is disconnected when no users of the service are found to be in the range of the BSS, and it is set up again when a first mobile station joins the packet data service.

A second possibility is that connections between the network and radio path are assembled and disassembled when need be. The examples described below include the connections provided according to the second possibility.

Figure 1B:
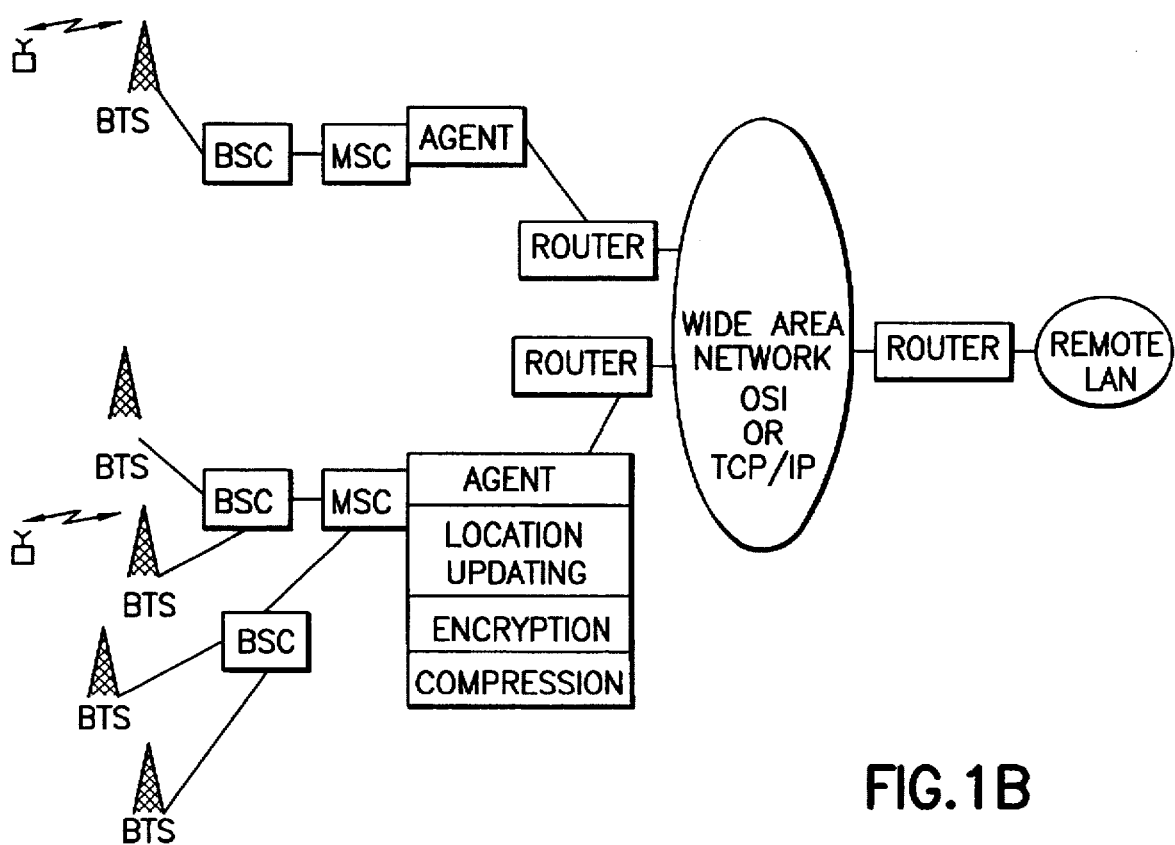
FIG. 1B presents a cellular network in accordance with the present invention

FIG. 1B shows a typical cellular network such as a GSM network provided with a data packet service in accordance with the invention. A data service unit (Agent) has been connected to a Mobile Switching Center, from where the packet data are conducted directly to a data network according to the OSI or TCP/IP protocol, and from there to a target network, such as a LAN. A difference between this network and the network of FIG. 1A lies in the fact that no data passes via the circuit-switched telephone network PSTN.

Figure 2:
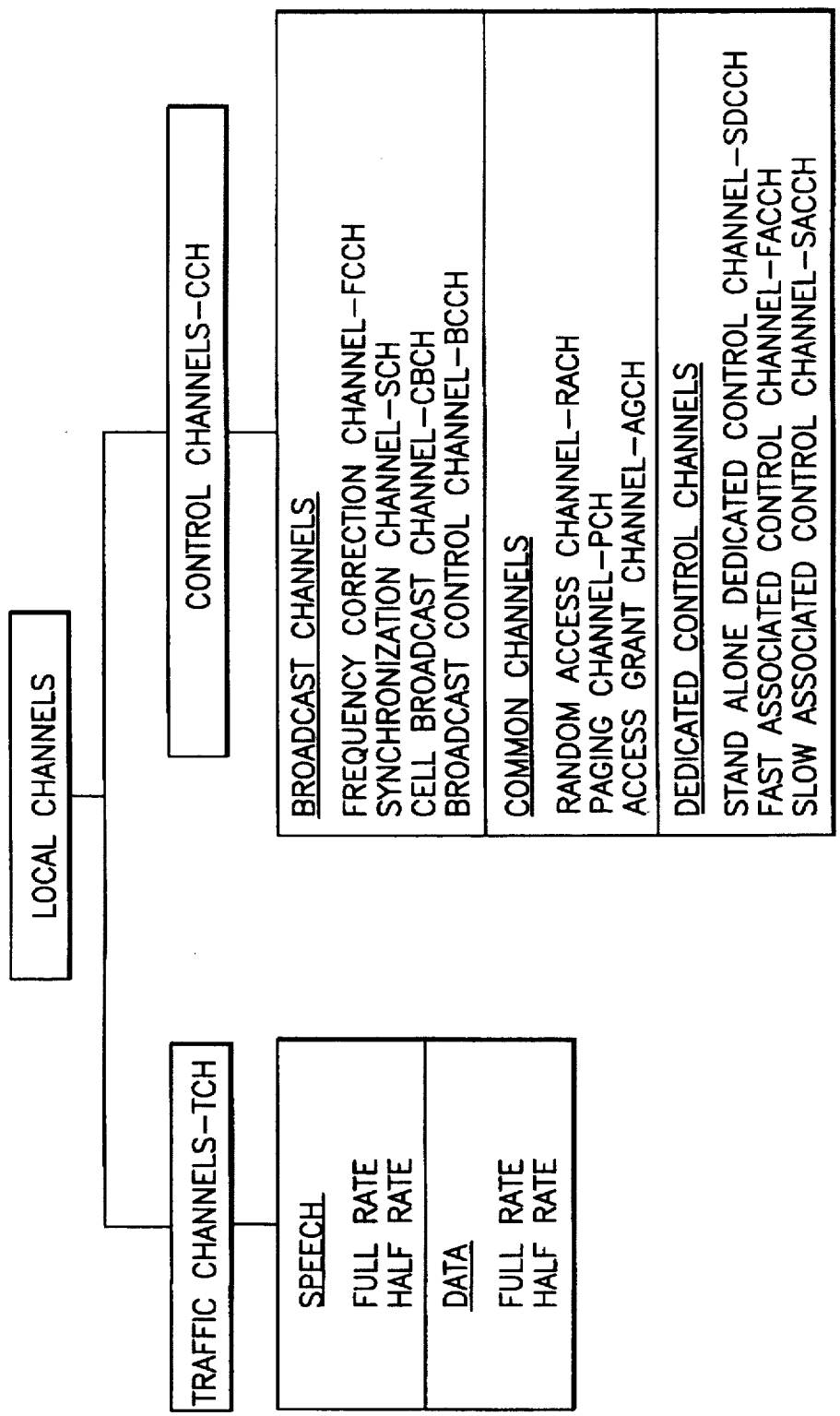
FIG. 2 is a schematic presentation of the logical channels of the GSM system.

According to FIG. 2, the logical channels are divided into traffic channels TCH and control channels CCH. The traffic channels are intended for transferring coded speech and data. Each of them can be transferred at full rate or half rate. The control channels CCH are intended to transfer signalling and synchronization data, and three types of channels can be distinguished thus: Broadcast Channels, Common Channels and Dedicated Control Channels. Below, "uplink" refers to the direction from a mobile station to a base station and "downlink" the direction from a base station to a mobile station.

The Broadcast Channels comprise the following:

a Frequency Correction CHannel, FCCH, transferring frequency correction data to the mobile station, downlink, a Synchronization CHannel, SCH, transferring synchronization data to the mobile station and identification data of the base station, downlink a Cellular Broadcast CHannel, CBCH, short message service, bi-directional channel, and a Broadcast Control CHannel, BCCH, transferring general information on the base station, downlink.

The Common Channels comprise the following:

a Random Access CHannel, RACH, uplink direction only, on which the mobile stations send a request for a dedicated channel a common Paging CHannel, PCH, whereby a base station sends a paging to a mobile station to inform of an incoming call, the channel being in downlink direction only, an Access Grant CHannel, AGCH, whereby the base station reports of a Stand-alone Dedicated Control CHannel, SDCCH, or directly of a Traffic CHannel, TCH, said channel being only downlink.

The Dedicated Control CHannels comprise the following:

a Stand-alone Dedicated Control Channel, bi-directional, and a Slow Associated Control Channel and a Fast Associated Control Channel, the channels being bi-directional.

In accordance with the present invention, a Traffic CHannel (bidirectional), TCH, a Paging CHannel, PCH, (unidirectional, downlink), a Random Access CHannel, RACH, (unidirectional, uplink), and an Access Grant CHannel, AGCH, (unidirectional, downlink) are made use of. Channels of equivalent types can also be found in digital cellular systems other than GSM.

The mobile station listens to the Broadcast Transmission Control CHannel BCCH transmitted continuously by the base station of the cell and is therethrough informed of a packet data service being engaged in the network. Another procedure is that the mobile station requests on the Cellular Broadcast CHannel by transmitting a short message service whether the packet data function is in use in the network or not. The base station sends a short message response on the same channel.

Figure 4:
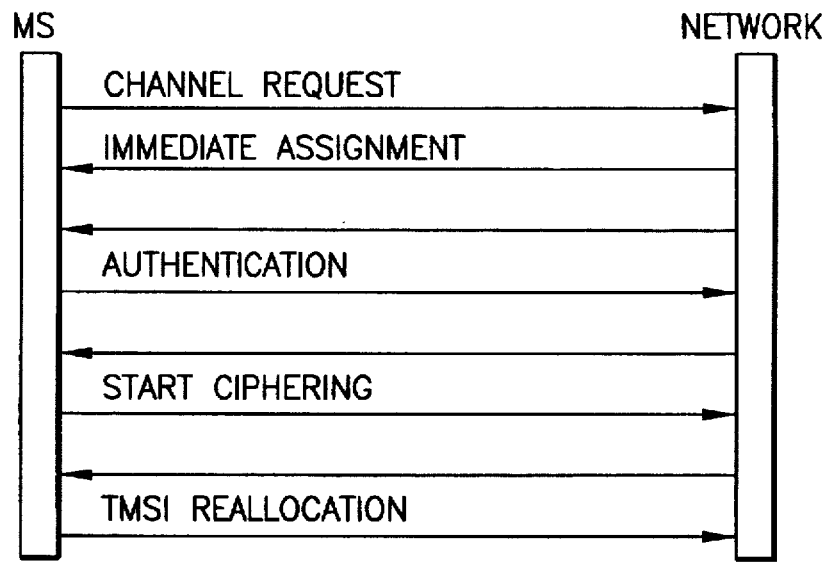
FIG. 4 presents the starting signalling of a virtual channel.

When a mobile station sends a request to be a user of a packet data service, a message sequence as shown in FIG. 4 is carried out therebetween and the Mobile Switching Center. The events are read from top to the bottom. After the channel request is transmitted by the Mobile Station an immediate assignment of the control channel follows (FACCH), and on the assigned channel the authentication of the requester is checked (the network inquires on the authentication data and the mobile station sends a response), encryption is started, and an interim identification number TMSI is allocated. A Radio Link Protocol is established and maintained thereafter permanently. This means that in the course of a session the transmission of data packets can be performed without reassembling the radio link protocol. The data service unit (Agent) in association with the Mobile Switching Center controlling the packet data service is informed, thus transferring the control of the mobile station under the control of its own. The data service unit is now able to detect the mobile station and carry out the encryption and authentication without extra signalling. The virtual channel from the Mobile Switching Center to the mobile station has now been assembled. The radio link protocol is not disassembled before the end of the session (the phone is released from the data packet service) whereby the virtual channel is disassembled.

Figure 3:
FIG. 3 illustrates the configuration of a channel request.
Figure 15:
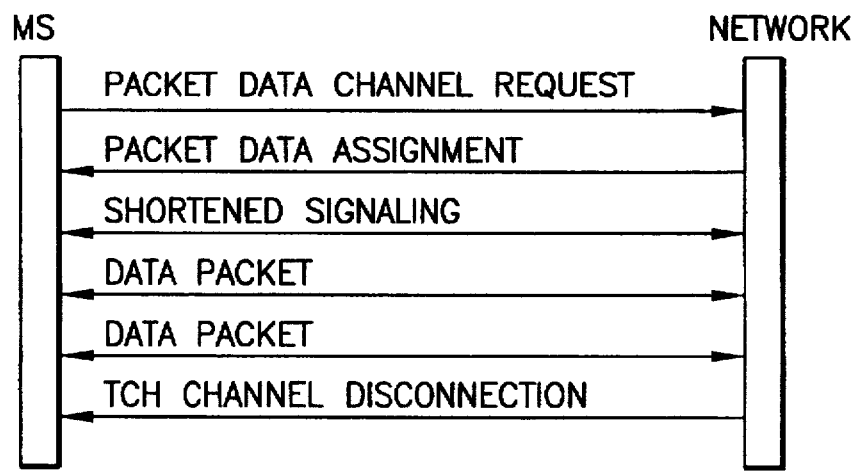
FIG. 15 presents signalling when a connection is broken at interfaces.

When a mobile station wants to transmit data, it transmits a request to set up a transfer channel for real packet data. The request is transmitted on a common Random Access CHannel RACH which is similar in configuration to the one shown in FIG. 3. By means of the first three bits of the message the nature of the connection is determined, and sequence 001 refers to a request to set up a data packet connection. The end of the message is a random reference number. The message is a modification of a standard GSM message. The base station receives the request, and after coding the sequence, it informs the mobile station on which control channel the signalling to be performed next is carried out and on which transfer channel the transfer of the packets is to take place. These phases are described by the two topmost phases in FIG. 15. The transmission channel has been assembled from the mobile station to the Base Station Controller. On a channel produced as above, the mobile station transmits first control messages, the third phase in FIG. 15, wherewith a data connection from the station to the data service unit (Agent) is provided, whereafter the channel from the mobile station to the Agent is complete for data transfer.

Figure 5:
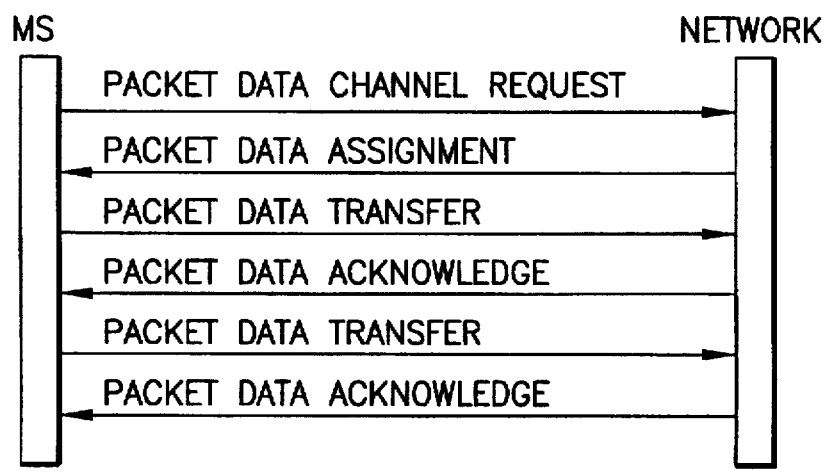
FIG. 5 presents the steps of transferring packet data.

When a true channel, the first part thereof comprising a radio channel and the latter part a PCM time slot, has in the above described manner been established between the mobile station and the base station, the mobile station is able to transmit immediately packet data on that channel. After a demand on data transmission by the network the station transmits data packets, the network acknowledges the packets and sands requests for a repeated transmission if a transmission has been defective. The phases up to that point are presented in FIG. 5.

Figure 6:
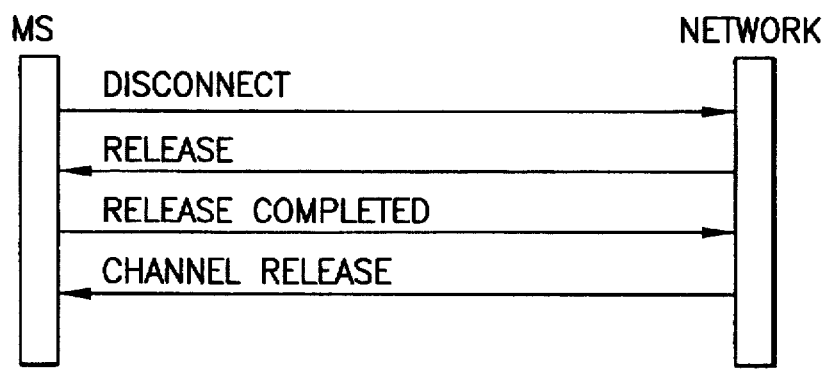
FIG. 6 presents the terminating signalling of the virtual channel.

After transmission of all packets, the mobile station sends a request to the network to disassemble the true connection. After receiving the request the network sends an order to the mobile station to terminate the data activities, and the station acknowledges termination of those activities. The phases are presented in FIG. 6. The data packet transfer channel to the base station controller BSC and from there on to the data service unit (Agent) is disassembled. If a method based on direct PCM connection is used, the channel is left on.

Figure 7:
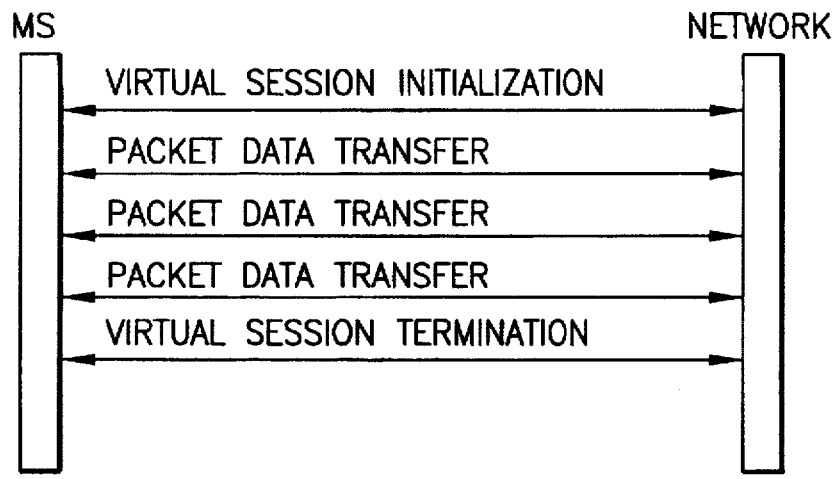
FIG. 7 presents a phase after a channel has been assembled.

Transfer of packet data may also be directed at the mobile station (i.e., it is mobile terminated). A base station sends on a common paging channel a paging to a mobile station, informing of a packet data transmission on the way. The mobile station then sends a channel request signal to the base station on the common Random Access CHannel RACH, whereby the process from that moment onwards is the same as in the mobile oriented case described above: establishing a virtual channel and immediate reception of packet data. In FIG. 7, each of the cases are presented step by step.

Figure 8:
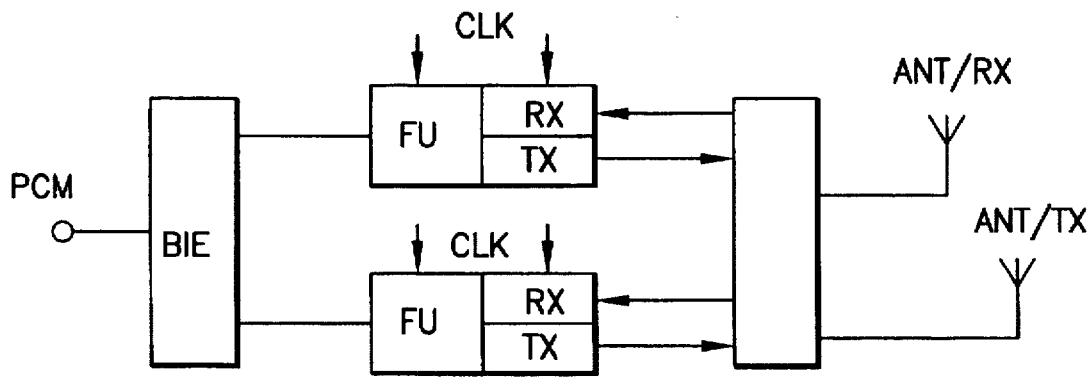
FIG. 8 is a diagrammatic presentation of a base station.

FIG. 8 shows a block diagram of a base station related to the present invention. The base station includes several parallel branches formed by the Framing Unit (FU) and the Transmitter/Receiver Unit RX/TX. A Base Band Interconnection Element (BIE) connects the base station to a digital PCM link. Part of the channels of the link are reserved for signalling and the rest for data transfer. The digital signals from the PCM link are conducted to the Framing Unit in which they are arranged into TDMA frames, channel-coded, interlaced and transmitted as bursts onto the radio path via antenna TX. Prior to the transmission, the bursts have been modulated in the transceiver unit RX/TX and transferred to a carrier wave frequency. When the base station receives a TDMA signal from the mobile station, the signal is conducted via the necessary filters to the transceiver unit RX/TX where it is demodulated, transferred to a carrier frequency, and the modulation is indicated. The channel decoding and discharge of interlacing are performed in the Framing Unit (FU). Finally, the data signal is conducted to the PCM line and therefrom via the Mobile Switching Center to the receiving network.

The Base Station Controller produces all messages transmitted to the radio path, and all received messages are transferred via the Base Station to the base station Controller. Therefore, compared with the GSM currently used, the embodiment of the invention requires only minor changes in the software of the Base Station Controller. Changes have to be made also in the softwares of the mobile station and of the Center. The mobile station has to be able to detect and transmit all messages related to packet data transfer. The messages transmitted by a mobile station can be originated by the user's keyboard or by a separate data terminal connected to the station.

The invention is described above with a view to assembling a virtual channel without mentioning more closely on which particular radio channel the transmission of data packets will take place.

In accordance with the first embodiment, the radio channel reserved for packet data transmission is a traffic channel TCH normally used for transmitting speech. On termination of transmission said packet data channel is free for use of any other mobile station. Such first embodiment is described below.

Figure 9:
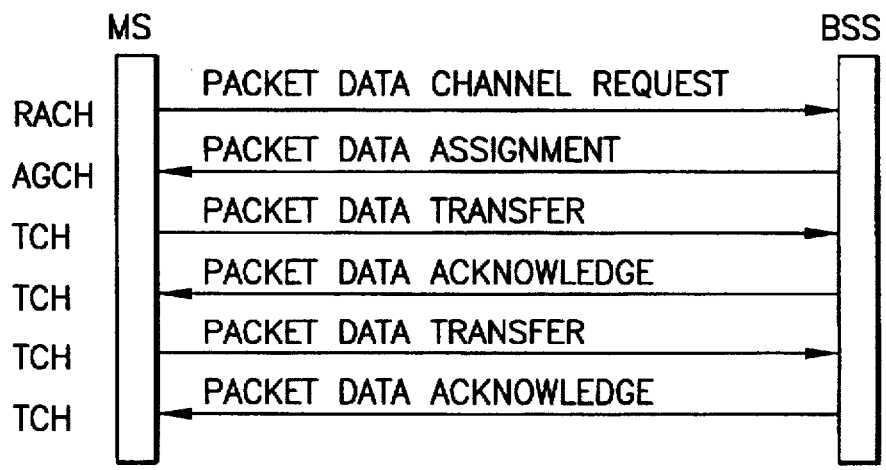
FIG. 9 illustrates mobile phone originated data transfer.

Reference is made to FIG. 9 showing packet data transfer in mobile station originated mode. The figure is equivalent to FIG. 5 and the description thereof, with an additional remark that also a mentioning has been added therein on which channel each message is transmitted. So, a mobile station sends a packet data channel request to a base station using a common Random Access CHannel RACH, which all stations in the cell use when requesting a radio channel. The base station replies by a traffic channel assignment on the common Access Grant CHannel AGCH, whereafter the packet data transfer and acknowledgement of reception are carried out on the traffic channel. The paging transmitted on the Random Access CHannel RACH contains a value 001 in the "Establishment Cause" as in FIG. 3. Said channel paging request is a modification of a standard channel paging of the GSM system. The value "001" would mean that the direction of the packets is from the network to the mobile station. The purpose thereof is so that the value of the "Establishment Cause" field is different in the mobile originated case and the mobile terminated case is to ensure that the priority of the mobile terminated case is higher because the network has already been made to prepare a connection.

The network responds to the paging on the Access Grant CHannel AGCH with a message called "Packet Data Assignment". The message is a modification from the standard GSM message "Immediate Assignment". The modification is such that the bit configuration of the "message type" block of said standard message is 00111101 in the present invention, said configuration not being used for any other purposes in GSM. After the message "Packet Data Assignment" the signalling is not continued on the Stand-alone Dedicated Slow Control Channel SDCCH, as the case would be in standard traffic channel trafficking, but on a Faster Associated Control Channel. This should be included in the message sent to the mobile station. The standard message includes an information part "channel description" and it includes an element "channel type". This element informs that the traffic channel has to be connected with. The bit configuration illustrating the full rate traffic channel TCH and the control channel FACCH associated thereto is "00001". In this element also the timing advance TA and power control are transmitted, these being necessary data for the mobile station.

When the mobile station has received the above-described modified message, it immediately moves to the traffic channel and starts data packet transmission. If the assembly of the connection between the mobile phone and the Mobile Switching Center requires more signalling prior to transfer of the mobile phone to data packet transmission, the signalling can be carried out on the full rate control channel FACCH.

The operating time of the traffic channel can be limited relative to the time available or the number of packets. The simplest and most effective method is possibly to transmit all data from the transmission buffer and to release the traffic channel TCH after the buffer is empty. Since the reservation of a true channel takes a few hundreds of milliseconds, a timer can be provided in the telephone counting the time after emptying the buffer. The traffic channel is not released until a set time has elapsed, not immediately after the transmission of the last packet. So, a transmission can be repeated or more transmitted (if more data have been accumulated in the buffer) without setting up a channel. The use of a timer increases the sense of interaction because the channel need not be established again and again in each case. If the transmission rate of the packets is high, the timer keeps the traffic channel TCH continuously reserved and the user receives the replies immediately. The time setting of the timer can be set by the user.

The operator may also select one traffic channel only in the cell for transferring data packets or equally a great number or even all traffic channels.

Figure 10:
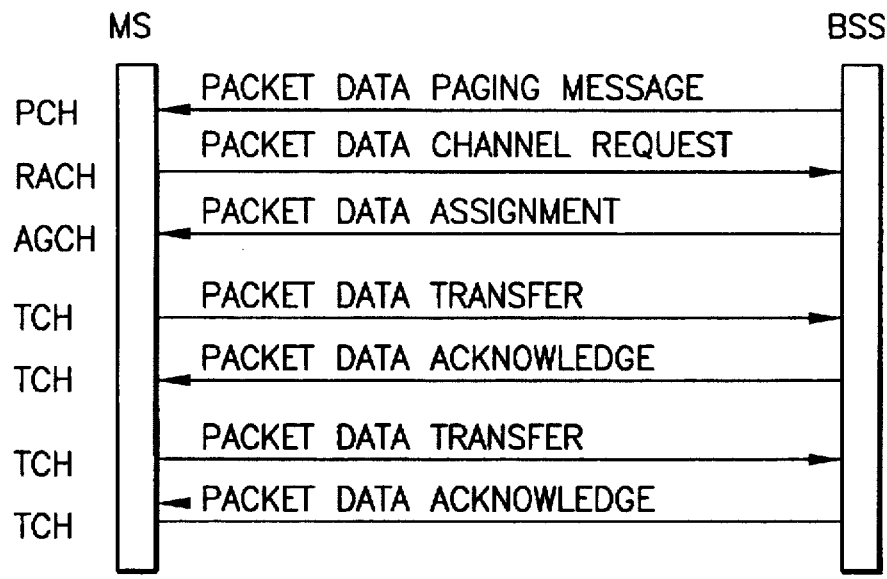
FIG. 10 illustrates data transfer terminating in a mobile phone.

FIG. 10 schematically shows the functions of the first embodiment when packet data are to be sent via the network from a mobile station. The only difference to the opposite case is that the network first informs the mobile station of the packet data transmission to come. The report takes place on the common paging channel PCH in a paging message. When the mobile station has received the paging, the activity is continued, as in the mobile station originated case, that is, the station transmits a channel request to the base station, and the operation goes on as described in association with FIG. 9.

Figure 11:
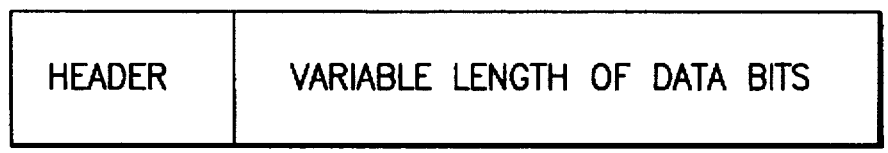
FIG. 11 presents a format of a packet data message.

FIG. 11 shows the formats of a packet data message of an arrangement in accordance with the first embodiment. The packets of the Virtual Channel Protocol, VCP, are produced using the OSI terminology in layer 3, above the link layer, and conducted via Layer 2 Relay Functions, L2R, to the Radio Link Protocol for transmission via the broadcast interface (radio path). The packet includes a header and a data part. The header includes the identification of the upper level protocol to be used. One of the upper level protocols is the protocol of the packet used in the signalling between the station and the Agent in association with the Mobile Switching Center. Other potential protocols are Internet Protocol (IP), Open Systems Interconnection (OSI) protocol and some fax protocols. The operator of the network may also add services of his own to be attended to by the Agent, these being provided with identifications of their own. The header may alternatively be also provided with a field informing of the length of the packets. The length of the data part of the packets, or the number of higher level octets, varies. One packet can be transferred in one or more RLP frames.

A second embodiment of the invention is described, according to which packet data can be transmitted either on a traffic channel TCH or on a common Random Access CHannel RACH, using a channel request, which can be, as above, an 8 bit byte with a bit sequence "001" at the beginning. Thereafter, the network transmits on the Access Grant Channel, AGCH, a message requesting transmission of packet data, the message being a modification of the standard GSM message. The element determining the message type thereof includes bit configuration "00111101", indicating that a packet data case is in question. In block "Channel Type" the bit configuration "00001" indicates that the mobile station should move to the traffic channel TCH to transfer the packet data thereon, and the bit configuration "10000" indicates that it has to stay on the Random Access CHannel RACH and to transfer the data packets on that channel. The network makes a decision which channel is to be used. If the telephone traffic in the cell is large scale, the transmission is carried out on the traffic channel, but if it is minor, the Random Access CHannel RACH is used.

The duration of transmission on the Random Access CHannel RACH is limited by means of a timer or counter as the Timing Advance, TA, changes very rapidly and the channel reservation occupies the possibilities from the others to request for a connection to be formed.

Figure 12:
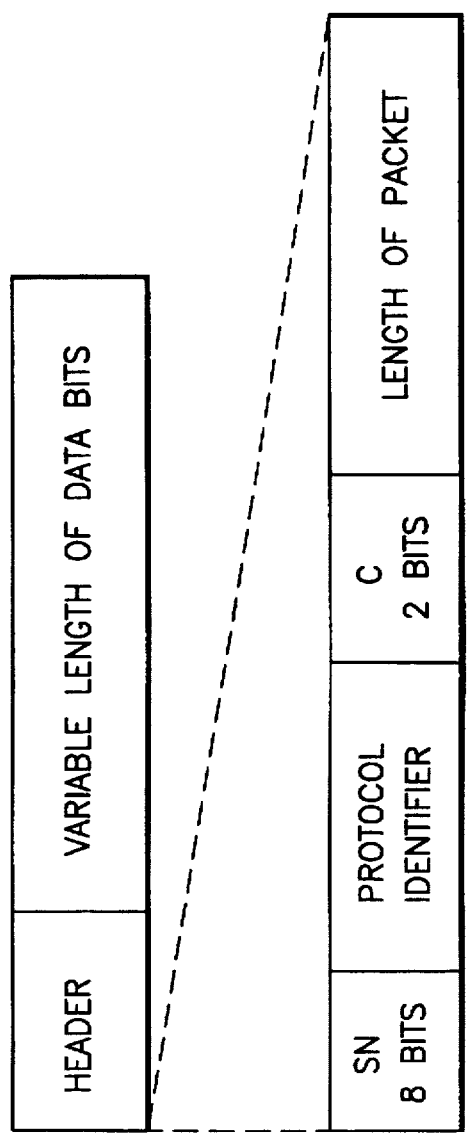
FIG. 12 presents a format of another packet data message.
Figure 13:
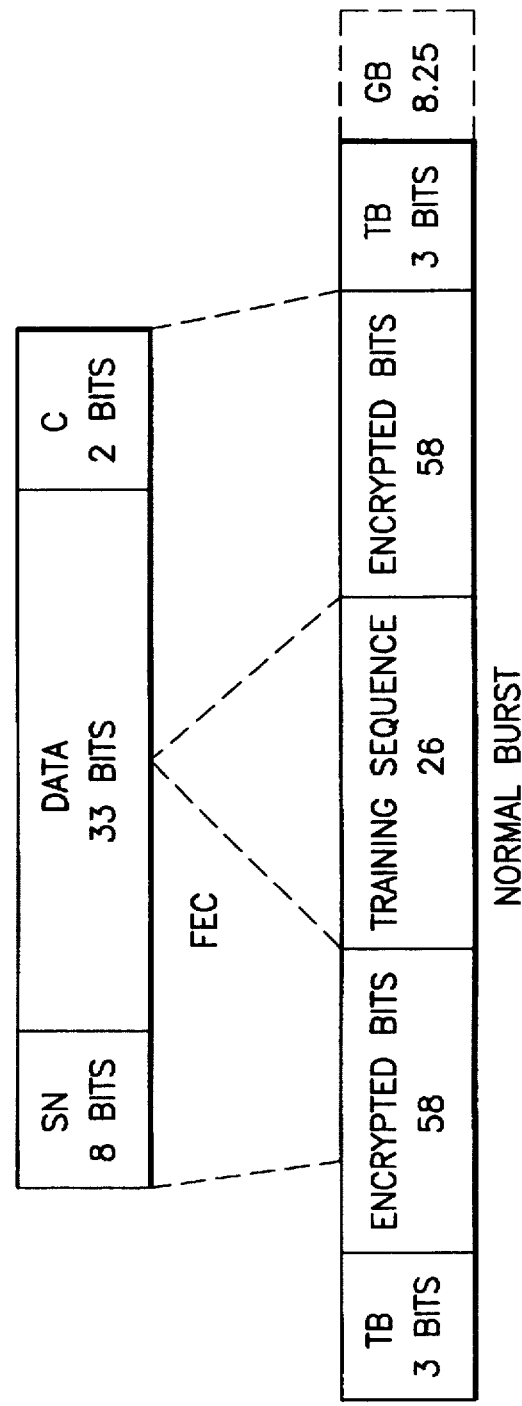
FIG. 13 presents an order of a RACH frame for a standard burst.

FIG. 12 shows the formats of a packet data message of an arrangement in accordance with the second embodiment. Each frame is provided with an 8-bit ordinal number SN acting as identification of a connection. It is generated by the base station and transmitted to the mobile station in conjunction with the assignment message of the packet data. The identification is released after the connection ends. The identification is necessary so that the data included in the same connection with the random access channel and the traffic channel can be combined. FIG. 13 presents a case in which packet data are transmitted on a random access channel. On that channel the packet data are transmitted as standard bursts, and the figure shows the equivalence of the RACH channel frame as standard bursts.

The mobile station is enabled to present in the form of a wish, which of the channels it wants to use for transmitting data. Each TCH and RACH frame is provided with two command bits, informing the channel of the subsequent frame. The connection via the RACH channel can be discontinued if a request to move to the traffic channel TCH arrives, and likewise, the connection via the TCH channel can be discontinued if a request to move to the RACH channel arrives. The command bits C at the ends of the frames are available for use of the mobile station for a channel shift request and moreover, the termination of a data transfer can be reported therethrough. These two bits can therefore be used as follows:

bits "11"=move to the same channel
bits "01"=move to traffic channel TCH
bits "10"=switch to the common Random Access CHannel and the common Paging CHannel PCH
bits "00"=transmission over.

The switching onto the transmission channel can be implemented in two ways. After the switch-on-the-channel command transfer, the mobile station is allowed to request for a channel in a "packet data channel request" message and to wait for a channel assignment message to be able to select the channel on which the data traffic will take place. Another alternative is to read the message on the network side and if a channel switching is requested in the command bits, the "packet data assignment" message is sent without any "packet data request" message. The packet has been transferred to a plurality of RLP frames. One of the RLP frames is interlaced into 22 standard bursts of the TCH channel.

The transmission of data packets is described above in mobile station-originated mode in an instance according to the second embodiment. The instance in which packet data are transmitted via the network to a mobile station differs from the above-mentioned case only in that the network reports the mobile station of future transmission in a particular "packet data paging request" message which it sends on a common Paging CHannel. The message is a modification of the paging of the GSM system being provided with a free bit configuration for this purpose. "001000011" is selected for the bit configuration. As an extension, a data field is added in the message, wherein the data to be transmitted to the user is transferred. After receiving this paging message (or a series of paging messages including the packet), the mobile station opens a connection and acknowledges the packet.

Figure 14:
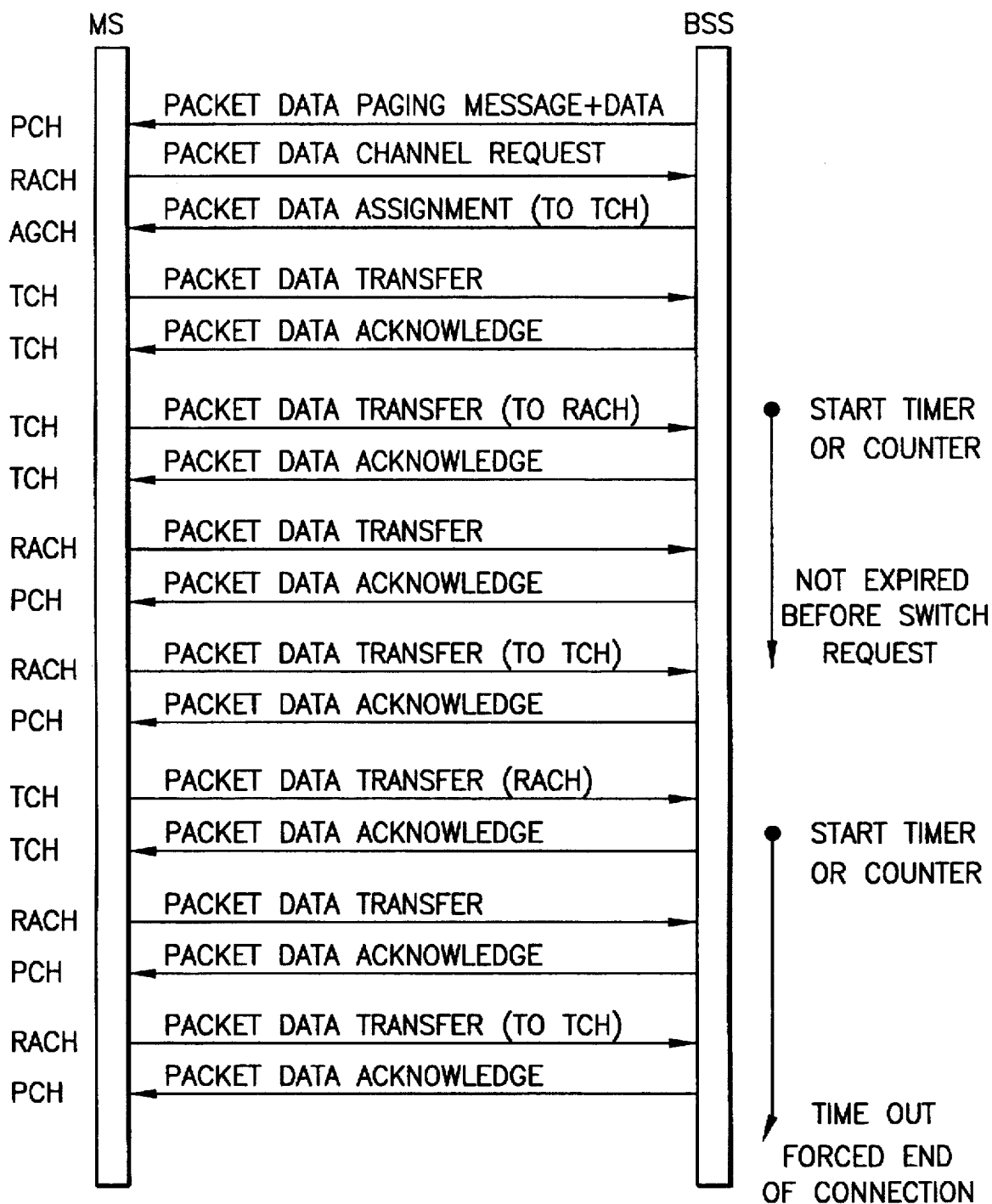
FIG. 14 presents the phases of a packet data transfer.

FIG. 14 presents schematically the events in temporal order when transmitting data packets via the network to the mobile station. The packet transfer first takes place on a traffic channel, moves onto a random access channel, returns on the traffic channel and then on the random access channels. On the random access channels the trafficking time runs out, and the connection is terminated forcedly.

In view of the foregoing description it will be evident to a person skilled in the art that various modifications may be made within the scope of the invention.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during prosecution of this application or of any such further application derived therefrom.

What we claim is:

1. A radio telephone system comprising:
   a mobile station having means for storing a first parameter, relating to another station, for setting up a real data communication channel having a reserved physical path between said mobile station and said another station; and
   said another station comprising a fixed station having means, wherein a second parameter relating to the mobile station for setting up said real data communication channel is capable of being stored, for forming a virtual data communication channel between the mobile station and the fixed station, said virtual data communication channel being a non-physical registration relationship using said first and second parameters and lacking a reserved path between said mobile station and said fixed station preparatory to the establishment of said real data communication channel, whereby the establishment of a real data communication channel is expedited when data is to be communicated between said mobile and fixed stations.

2. A system according to claim 1, further comprising means for communicating a first parameter relating to said mobile station to be stored in the fixed station parameter storing means to form the virtual data communication channel when a mobile station having data communication capability registers with the fixed station.

3. A system according to claim 1, further comprising means for forming the real data communication channel when a mobile station registered with the fixed station requests the setting up of a data communication channel.

4. A system according to claim 1, further comprising means for forming traffic channels, usually reserved for speech communication, and control channels between the mobile station and the fixed station, and wherein the real data communication channel is a traffic channel usually reserved for speech communication.

5. A system according to claim 1, further comprising means for forming traffic channels, usually reserved for speech communication, and control channels between the mobile station and the fixed station, and wherein the real data communication channel is a control channel.

6. A system according to claim 1, further comprising control means for controlling communication between the mobile station, the fixed station and an external communication network.

7. A system according to claim 1, further comprising means for adapting the real data communication channel for transmitting packet data.

8. A digital time-division cellular network having a base station and a plurality of mobile stations, wherein radio channels between the mobile stations and the base station comprise:
   a plurality of Traffic CHannels (TCH) for transferring speech and data between the mobile stations and the base station,
   a control channel in association with each of said TCH channels, said control channels comprising:
   a Random Access CHannel (RACH), for conducting signals from the mobile stations to the base station requesting a TCH channel,
   a common Paging CHannel (PCH), for conducting a paging signal from the base station to a mobile station,
   an Access Grant CHannel (AGCH), for conducting a signal from the base station to inform a mobile station of the TCH channel assigned thereto,
   and further comprising:
   a packet data service unit (Agent) for connecting the cellular network to a data network,
   means for switching a mobile station to the Agent and signalling for the setting up of a connection to the data network,
   means in a mobile station and the Agent for storing a number of parameters relating to each other, said parameters including a Radio Link Protocol (RLP) and forming a virtual channel, said virtual channel being a non-physical registration relationship using said parameters and lacking a reserved path between said mobile station and said Agent preparatory to the establishment of a packet data transfer channel,
   means, responsive to a request from a mobile station to transfer or receive data packets, for assembling a packet data transfer channel between the mobile station and the Agent, making use of the parameters of the virtual channel, and wherein said packet data transfer channel comprises a first part comprising a radio channel between said mobile station and the base station and a second part comprising a time slot in a digital trunk line between said base station and said Agent,
   means for transferring data packets over said packet data transfer channel, means, responsive to the termination of data packet transfer over said packet data transfer channel, for disassembling at least said radio channel, and means for maintaining the virtual channel until the release of a mobile station from the Agent.

9. A network according to claim 8, wherein the Agent comprises:

means for registering all mobile stations connected to the Agent, means for informing a mobile station of any data packets addressed thereto, means for transferring data packets from a mobile station addressed to the data network, means for transferring messages to the mobile station entering the Agent from the data network, means for buffering data packets, means for performing encrypting/decrypting, means for performing compression/decompression of the data to and from a mobile station, means for updating a data base of the location of the mobile stations, means for receiving data packets from the data network addressed to the cellular network and transferring them to the mobile stations, and means for removing a mobile station from the register after it is disconnected from the Agent.

10. A network according to claim 8, wherein the packet data service unit (Agent) comprises means for adapting the data packets from the data network to virtual channel protocol packets, said virtual channel protocol packets being composed of one or more radio link traffic protocol (RLP) frames.

11. A network according to claim 10, wherein the virtual channel protocol packets comprise an identification part indicating whether the contents of a packet contain signalling data or upper layer data.

12. A network according to claim 8, further comprising means, in a mobile station, for initiating the transmitting of data packets by sending a request on the RACH channel for establishing a packet data transfer channel, said request being a modification of the standard channel establishing request of the cellular network.

13. A network according to claim 8, further comprising means in the base station, responsive to data packets to be transferred to a mobile station, for sending a message on the common PCH channel to the mobile station about said data packets to be transferred and means at the mobile station, responsive to said message for sending on the RACH channel a request to the base station for establishing a packet data transfer channel, said request being a modification of the standard channel establishing request of the cellular network.

14. A network according to claim 8, further comprising means, in the base station, for transmitting control channel data used in channel establishment signalling and packet data transfer channel data to the mobile stations.

15. A network according to claim 14, further comprising means for establishing, after the channel establishment signalling between the mobile station and the base station, said second part of the packet data transfer channel with said Agent, whereby the entire packet data transfer channel is ready for packet transfer.

16. A network according to claim 8, wherein said cellular network comprises a Dedicated Fast Access Channel (FACCH), and further comprising means for causing said channel establishment signalling to be carried out on a Dedicated Fast Access CHannel, FACCH of the cellular network.

17. A network according to claim 8, further comprising a base station controller connected to the base station and wherein the second part of the packet data transfer channel is a direct PCM connection from the base station controller to the Agent, whereby said second part of the packet data transfer channel is active irrespective of the packet data transfer.

18. A network according to claim 8, wherein the second part of the packet data transfer channel is a variable time slot on the PCM trunk line, and further comprising means whereby said second part is disassembled after the termination of the data packet transfer.

19. A network according to claim 8, wherein the first part of the packet data transfer channel is a TCH channel.

20. A network according to claim 8, further comprising means for causing the first part of the packet data transfer channel to be a RACH channel when packet data are transferred from the mobile station to the Agent, and to be the common PCH channel when packet data are transferred from the Agent to the mobile station.

21. A network according to claim 8, further comprising means for causing, in the course of a transfer of packet data, the first part of the packet data transfer channel to be any one of the TCH channel, the RACH channel, and the common PCH channel.

22. A network according to claim 8, wherein a broadcast paging message transmitted to all mobile stations of the cellular network and a multicast paging message transmitted to certain mobile stations of the cellular network are transmitted on the data section of the broadcast and the multicast protocols, respectively.

23. A method of transmitting data in a radio telephone network comprising:

storing at a fixed station a first parameter relating to a mobile station and the setting up of a real data communication channel between the mobile station and the fixed station; and storing at the mobile station a second parameter relating to the fixed station and the setting up of a real data communication channel between the mobile station and the fixed station, for forming a virtual data communication channel between the mobile station and the fixed station, the virtual data communication channel being a non-physical registration relationship using the first and second parameters and lacking a reserved path between the mobile station and the fixed station preparatory to the establishment of a real data communication channel, thereby expediting establishment of a real data communication channel between the mobile station and the fixed station in response to an appropriate request.

24. A method according to claim 23, further comprising forming the virtual data communication channel when a mobile station having data communication capability registers with the fixed station.

25. A method according to claim 23, further comprising forming the virtual data communication channel when a mobile station registered with the fixed station requests the setting up of a real data communication channel.

26. A method according to claim 23, wherein said network comprises traffic channels usually reserved for speech communication, and control channels, and further comprising utilising a traffic channel usually reserved for speech communication for the real data communication.

27. A method according to claim 23, wherein said network comprises traffic channels usually reserved for speech communication, and control channels, and further comprising utilising a control channel as the real data communication channel.

28. A radio telephone having storage means therein to store a parameter relating to a fixed station for setting up a real data communication channel with said fixed station and for forming a virtual data communication channel with the fixed station by utilizing a parameter relating to said radio telephone stored in said fixed station, the virtual data communication channel being a non-physical registration relationship using the respective stored parameters and lacking a reserved path between the radio telephone and the fixed station preparatory to the establishment of a real data communication channel, thereby expediting establishment of a real data communication channel between said radio telephone and said fixed station in response to an appropriate request.

29. A radio telephone according to claim 28, further comprising means adapted to store said parameter in said storage means when said radio telephone has a data communication ability and when said radio telephone registers with the fixed station.

30. A radio telephone according to claim 28, further comprising means adapted to store said parameter in said storage means when said radio telephone is registered with the fixed station and requests the setting up of a data communication channel.

31. A radio telephone system according to claim 1 wherein said mobile station comprises a radio telephone.

32. A method according to claim 23 wherein said mobile station comprises a radio telephone.

* * * * *